Nov. 18, 1947.  J. T. KING  2,430,985

QUICK RELEASE MECHANISM

Filed May 2, 1945

INVENTOR.
JAMES T. KING
BY Albert S Perry
ATTORNEY

Patented Nov. 18, 1947

2,430,985

UNITED STATES PATENT OFFICE 2,430,985

QUICK RELEASE MECHANISM

James T. King, Manchester, Conn., assignor to Pioneer Parachute Company, Inc., Borough of Manchester, Conn., a corporation of Connecticut Application May 2, 1945, Serial No. 591,516

16 Claims. (Cl. 24—205)

My invention relates to quick release mechanism for parachute harnesses and particularly to devices of this character which are simple in construction and positive in their locking and releasing operations.

Quick release mechanisms for parachute harnesses are employed for connecting and releasing the straps of the harness so that they will remain securely in place on the wearer and cannot be accidentally or prematurely released before or during a parachute descent, but may be operated positively and easily by the wearer so that he may free himself quickly from the harness and parachute on landing. In order to attain this result while insuring the maximum of safety, it is usual to employ retaining and locking means for the harness which require two different and successive operations to release the harness. In this way it is possible to prevent accidental release of the harness in the event it is struck by some object or catches on an obstruction as the wearer moves about in the aircraft or during descent. However, because of the unusual character and movements required in such locking and releasing means the devices of the prior art have generally been complicated in construction and difficult to operate. Moreover, they have been so intricate in design that they cannot be readily inspected or repaired and when employed for military use where they are often exposed to dust, sand and weather, any closely fitting relatively movable parts may become so fouled with dirt as to render the mechanism inoperative.

A further objection to constructions of the prior art results from the fact that the locking means or bolts heretofore employed have generally been engaged directly by the harness elements. In such constructions the tension and strains to which the harness is subjected, such as those encountered when the wearer lands in a high wind, are applied directly to the locking bolts or other movable elements and as a result the bolts tend to tilt or jam and are subjected to so much friction that they cannot be moved easily.

In accordance with my invention these objections to constructions of the prior art are overcome by providing locking and releasing means for parachute harnesses embodying a limited number of parts which are readily movable in locking and releasing the harness elements. A particular feature of my invention resides in the nature of the actuating means employed whereby two distinct releasing movements may be imparted to the actuating means simultaneously, and as incidents of one manual releasing operation, but cannot be accidentally imparted to the actuating means so as to cause unintentional release of the harness.

A further feature of my invention resides in the use of locking means in which the movable elements thereof are held out of contact with harness elements which might impose friction or strains upon the movable elements.

One of the objects of my invention is to provide a novel quick release mechanism for parachute harnesses which is simple in construction and positive in operation.

Another object of my invention is to provide quick release mechanisms for parachute harnesses which are capable of movement to release the harness in a single manual operation.

A further object of my invention is to provide a parachute harness with a quick release mechanism wherein movement of the locking elements is unaffected by strains to which the harness may be subjected.

These and other objects and features of my invention will appear from the following description thereof in which reference is made to the figures of the drawings.

Figure 1:
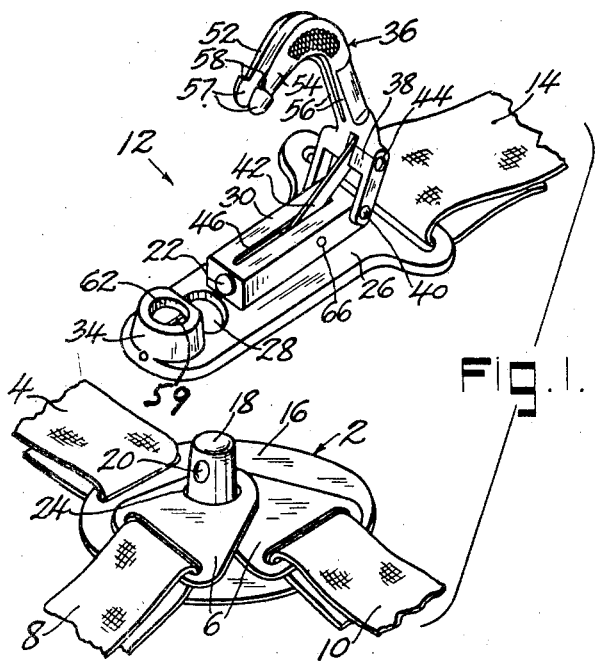
Fig. 1 is a perspective of portions of a parachute harness having a preferred form of quick release mechanism embodying my invention carried thereby, the parts being shown in releasing position.
Figure 4:
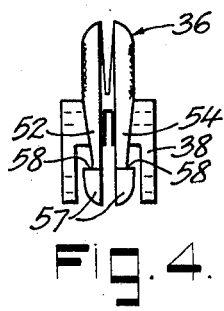
Fig. 4 is an end view of the retaining means illustrated in Figs. 1, 2 and 3.
Figure 3:
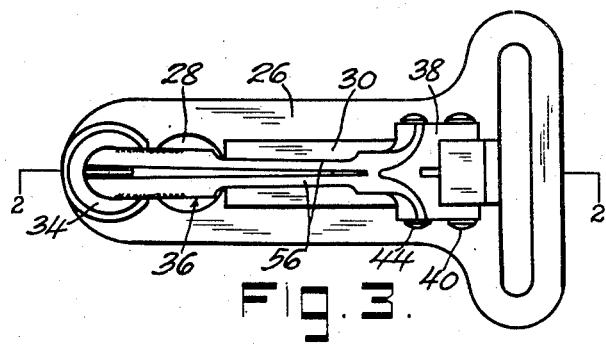
Fig. 3 is a top plan view of the retaining means shown in Figs. 1 and 2.

In that form of my invention illustrated in the figures of the drawing the quick release mechanism is similar to that shown and described in my copending application Serial No. 534,605, filed May 8, 1944, in that it embodies an attaching member 2 carried by a strap 4 of the parachute harness, connectors 6 carried by other harness straps 8 and 10 and loosely engaging the attaching member, and a retaining member 12 which is carried by a strap 14 of the harness and is releasably connected to the attaching member and overlies the connectors to hold them in place on the attaching member.

The attaching member is provided with a plate or base 16 having a stud 18 which projects from the base and is provided with an opening 20 therein for receiving the bolt 22 of the retaining member 12. The connectors 6 are in the form of plates or D-rings having openings 24 therein of larger diameter than the stud 18 of the attaching member so that they will fit loosely over the stud and may be readily applied and removed therefrom.

The retaining member of the present invention is shown as having a base 26 provided with a circular opening 28 therein of sufficient diameter to receive the stud 18 of the attaching member. The locking bolt 22 is slidably mounted in the housing 30 on the upper surface of the base of the retaining member and is movable from the retracted position of Fig. 1 to the projected position illustrated in Fig. 2 in which the end of the bolt 22 extends from the housing 30 and passes through the opening 20 in the stud 18 of the attaching member and into a keeper recess 32 in the upwardly projecting boss 34 on the free end of the retaining member.

The bolt 22 is positively movable to its retracted and projected positions by actuating means in the form of a handle or lever 36 having a yoke 38 on the end thereof which straddles the bolt housing 30 and is pivotally mounted thereon by the pivot pin 40. The lever 36 is connected to the bolt 22 by a link 42 which is connected to the yoke 38 by the pivot pin 44 and extends through the slot 46 in the housing 30 to the bolt 22, where it is connected by a pivot pin 48. A spring 50 located within the housing 30 urges the bolt 22 toward its fully projected position and urges the lever 36 toward the position shown in Fig. 2 in which the lever is locked against accidental movement.

Figure 2:
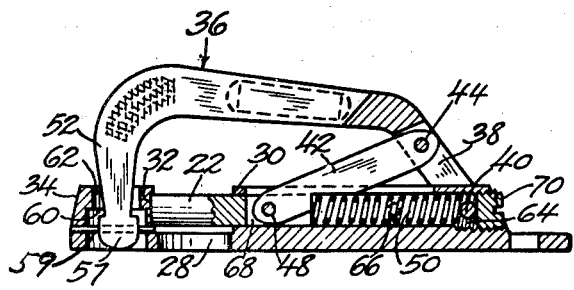
Fig. 2 is a vertical sectional view through the retaining means illustrated in Fig. 1, taken along the line 2—2 of Fig. 3.

With this construction the harness may be readily secured in place on the wearer by placing the connectors 6 over the stud 18 on the attaching member and then connecting the retaining member to the attaching member over the connectors. The retaining member is connected to the attaching member by moving the lever 36 to the raised position shown in Fig. 1 so as to retract the bolt 22 against the action of spring 50. The bolt then clears the opening 28 in the base of the retaining member and the retaining member may be slipped over the stud 18 to hold the connectors 6 in place on the attaching member. The bolt 22 is then brought into registry with the opening 20 in the stud 18 and moved to its projected and retaining position as shown in Fig. 2 by movement of the lever from the bolt retracting position of Fig. 1 to the bolt projecting position of Fig. 2.

Locking movement of the lever 36 and bolt 22 may be effected positively and manually to force the bolt through the opening 20 in the stud in the event there is any friction between the parts. However, locking movement of the lever and bolt is aided by the spring 50 and it is preferable to employ a spring for this purpose which is strong enough to cause the bolt and handle to automatically move to their fully locked positions whenever the lever 36 is released. Movement of the lever 36 in a clockwise direction from the position shown in Fig. 2 to that shown in Fig. 1 serves to retract the bolt from engagement with the stud 18 of the attaching member for releasing the retaining member from the attaching member so that the connectors can slip freely off the stud 18. During releasing movement of the lever 36 the link 42 positively moves the bolt to the right against the action of the spring 50.

The actuating means thus provided are easily operable to move the bolt positively to either its projected or its retracted position. Moreover, the leverage exerted upon the bolt in moving it in each direction is sufficient to assure movement and prevent jamming of the parts even though dust or dirt may be present. The simplicity and obvious construction of the mechanism also renders it easy to clean and inspect and enables the wearer to tell at a glance whether the parts are properly connected.

In order to prevent accidental or unintentional operation of the handle or lever 36 to release the harness the lever is provided with locking means which serve to hold it in bolt projecting position. For this purpose the free end of the lever is split so as to provide two spring portions 52 and 54 which are connected to the yoke by the relatively thin resilient webs 56. The portions 52 and 54 are therefore yieldable toward and away from each other, but they are normally sprung so that they tend to spread apart and are urged away from each other. The extremities of the portions 52 and 54 of the lever 36 are provided with enlarged heads 57 which present upwardly facing shoulders 58 for engagement with the complementary downwardly facing shoulders 60 on the inner surface of the opening 62 in the boss 34 on the free end of the base of the retaining member. The heads 57 on the ends of the portions 52 and 54, when pressed together are of smaller diameter than the opening 62 in the boss and the lower faces of the heads are rounded to present inclined surfaces engageable with edges of the opening 62 so that movement of the lever toward the base of the retaining member causes the heads 57 to be forced together until they have passed below the shoulder 60 on the boss. The heads then spring apart automatically bringing the shoulders 58 thereon into position beneath the shoulders 60 on the boss to lock the lever 36 in place and prevent accidental releasing movement of the lever 36 and accidental retracting movement of the bolt 22.

The lever 36 thus serves as a handle having compressible means thereon which may be manually released by pressing the portions 52 and 54 toward each other so as to disengage the shoulders 58 from the shoulders 60 on the boss 34. The free end of the lever can then be moved easily away from the base 26 of the retaining member and from the bolt projecting position of Fig. 2 to the bolt retracting position of Fig. 1 in which the bolt is withdrawn from the opening 20 in the stud 18 of the attaching member 2. In order to insure release of the lever 36 when the portions 52 and 54 are pressed together it is of course necessary for both of the heads 57 to be moved from beneath the shoulders 60 on the boss 34. Therefore a pin 59 is located in the opening 62 and extends across the center of the opening to limit lateral movement of the heads 57 and to center them with respect to the opening 62 when the portions 52 and 54 are pressed together preparatory to withdrawal of the heads from the opening.

The two releasing movements of compressing the portions 52 and 54 and raising the lever 36 are required to actuate the bolt 22 of the retaining member. Moreover, the outward pull on the handle or lever 36 which serves to retract the bolt 22 also serves to lift the retaining member from the stud on the attaching member so that the connectors 6 are free to slip from the stud 18 for releasing the harness from the wearer. In this way, when the lever is manually operated, both of the lever releasing movements as well as the operation of lifting and removing the retaining member from the attaching member are performed in the proper succession and as natural and necessary incidents of the one operation of grasping the lever and pulling it outward. The user therefore can release the harness in one quick and easy movement and without any fumbling or conscious manipulation of the lever in multiple and successive ways to effect its operation. On the other hand, the lever cannot be released accidentally by striking or catching on an object since a force applied laterally on the lever, which might disengage the head 57 on one of the spring portions of the lever, will only serve to urge the head on the other spring portion more firmly into locking engagement with the shoulder 60 on the boss 34. It is only when the two spring portions 52 and 54 are moved in opposite directions and toward each other that the lever is released for movement and such a combined compression and lifting of the lever will not result from any known type of accidental treatment to which the lever might be subjected. It will thus be apparent that my retaining and actuating means affords the high degree of safety which is of paramount importance in parachute harnesses while at the same time it is possible to release the retaining means manually in what seems to be a single and natural operating movement.

The construction shown and described has the further advantage that the bolt 22 is shielded from contact with the connectors 6 by the base 26 of the retaining member and is at no time subjected to the strains incident to shock loading of the harness when the canopy opens, or to friction resulting from tension on the suspension means or harness after the wearer lands. For this reason all danger of bending, distortion or jamming of the bolt due to strains thereon is eliminated and the bolt therefore is readily movable at all times. Moreover, the force applied to the bolt through operation of the lever is ample to insure its movement even though dirt or grit should work its way into the device or unusual friction should be presented for any other reason.

In assembling the parts of the retaining member the bolt 22 is slipped into the bolt housing 30 through the threaded opening 64 in the end of the housing and is moved to a position such that the opening in the bolt for receiving the pivot pin 48 is opposite the transversely extending hold 66 in the bolt housing. The end of the link 42 then is inserted into the slot 46 in the housing and into the slot 68 in the inner end of the bolt and the pivot pin 48 is then inserted through the opening 66 to secure the link to the bolt. Spring 50 is passed into the threaded opening 64 in the end of the housing and compressed until the end of the spring is beyond the lateral opening for receiving the pivot pin 40 upon which the yoke of the lever is mounted. The lever is then put in place and the pivot pin inserted to mount the lever for pivotal movement and to hold the spring 50 compressed. The outer end of the link 42 is connected to the lever 36 by pivot pin 44 and finally a threaded plug 70 is inserted into the opening 64 in the bolt housing to close the housing. The pivot pins are preferably set up at their ends to prevent them from being displaced but they may be otherwise secured in position if desired.

The limited number of parts and the simplicity of their construction and operation enables the wearer to see whether the device is properly applied and fastened so that he is sure of his safety. In the event any element should be injured or defective it can be readily replaced and it is possible to apply and remove the harness in the dark by simply feeling and moving the parts about.

While the particular construction illustrated in the drawings and herein described is preferred, it will be apparent that numerous changes may be made in the form, construction and arrangement of the mechanism and the elements employed may be carried by various straps or portions of a parachute harness. In view thereof it should be understood that the embodiment of my invention described and shown is intended to be illustrative only and is not intended to limit the scope of my invention.

I claim:

1. Quick release mechanism for parachute harness comprising an attaching member carried by one harness element, a retaining member carried by another harness element and releasably connected to said attaching member, a handle on the retaining member movable to release the retaining member from the attaching member, means for locking said handle against movement, and means on said handle movable when the handle is grasped for unlocking said handle to release it for movement.

2. Quick release mechanism for parachute harness comprising an attaching member carried by one harness element, a retaining member carried by another harness element and releasably connected to said attaching member, a handle on the retaining member movable to release the retaining member from the attaching member, means for locking said handle against movement, and yieldable means on said handle movable in opposite directions when the handle is grasped to unlock the handle for movement to release the retaining member.

3. Quick release mechanism for parachute harness comprising an attaching member carried by one harness element, a retaining member carried by another harness element and releasably engaging said attaching member, a handle carried by the retaining member and movable to release the retaining member from the attaching member, yieldable locking means on the handle movable into and out of engagement with the retaining member for controlling movement of said handle, and means on the handle connected to the locking means and positioned to be moved when the handle is grasped for moving the locking means out of engagement with the retaining member whereby the handle may be released for movement to disconnect the retaining member from the attaching member.

4. Quick release mechanism for a parachute harness comprising a stud having an opening therein and retaining means releasably engaging said stud and formed with an opening through which the stud may project, a bolt movable across the opening in the retaining means and into the opening in said stud, and a lever pivotally mounted on said retaining means and connected to said bolt for withdrawing the bolt from the opening in said stud.

5. Quick release mechanism for a parachute harness comprising a stud having an opening therein, retaining means releasably engaging said stud and formed with an opening through which the stud may project, a bolt movable across the opening in the retaining means and into the opening in said stud, a lever pivotally mounted on said retaining means, and a link connecting the lever to the bolt for moving the bolt into and out of engagement with said stud.

6. Quick release mechanism for a parachute harness comprising a stud having an opening therein, retaining means releasably engaging said stud and formed with an opening through which the stud may project, a bolt movable across the opening in the retaining means and into the opening in said stud, a lever pivotally mounted on said retaining means and connected to said bolt for withdrawing the bolt from the opening in said stud, and means for holding said lever in position to retain the bolt in engagement with the stud.

7. Quick release mechanism for a parachute harness comprising a stud having an opening therein, retaining means releasably engaging said stud and formed with an opening through which the stud may project, a bolt movable across the opening in the retaining means and into the opening in said stud, a lever pivotally mounted on said retaining means and connected to said bolt for withdrawing the bolt from the opening in said stud, and cooperating means on the lever and retaining means for holding said lever in position to retain the bolt in engagement with the stud.

8. Quick release mechanism for a parachute harness comprising a stud having an opening therein, retaining means releasably engaging said stud and formed with an opening through which the stud may project, a bolt movable across the opening in the retaining means and into the opening in said stud, a lever pivotally mounted on said retaining means and connected to said bolt for withdrawing the bolt from the opening in said stud, and compressible means on the lever movable into locking engagement with the retaining member for holding the lever in position to retain the bolt in engagement with the stud.

9. Quick release mechanism for parachute harness comprising a stud having an opening therein, a retaining means releasably engaging said stud having a base with an opening therein for receiving the stud, a bolt slidably movable on the retaining member across the opening in said base and into the opening in the stud, a lever mounted on the retaining member and connected with said bolt for moving it into and out of the opening in said stud, locking means on the retaining member, and compressible means on said lever in position to retain said bolt in engagement with said stud.

10. Quick release mechanism for parachute harness comprising an attaching member carried by one harness element and having an opening therein, connectors carried by other harness elements and engaging said attaching member, a retaining member overlying said connectors and having a bolt movable into and out of the opening in the attaching member to releasably hold said retaining member and connectors in engagement with said attaching member, and a lever pivotally connected to said retaining member and bolt for moving the bolt into and out of said opening in the attaching member.

11. Quick release mechanism for parachute harness comprising an attaching member carried by one harness element and having an opening therein, connectors carried by other harness elements and engaging said attaching member, a retaining member overlying said connectors and having a bolt movable into and out of the opening in the attaching member to releasably hold said retaining member and connectors in engagement with said attaching member, a lever pivotally connected to said retaining member and bolt for moving the bolt into and out of said opening in the attaching member, and means for urging said bolt toward the latter opening.

12. Quick release mechanism for parachute harness comprising an attaching member carried by one harness element and having an opening therein, connectors carried by other harness elements and engaging said attaching member, a retaining member overlying said connectors and having a bolt movable into and out of the opening in the attaching member to releasably hold said retaining member and connectors in engagement with said attaching member, a lever pivotally connected to said retaining member and bolt for moving the bolt into and out of said opening in the attaching member, and means for retaining said bolt in the latter opening.

13. Quick release mechanism for parachute harness comprising an attaching member carried by one harness element and having an opening therein, connectors carried by other harness elements and engaging said attaching member, a retaining member overlying said connectors and having a bolt movable into and out of the opening in the attaching member to releasably hold said retaining member and connectors in engagement with said attaching member, a lever pivotally connected to said retaining member and bolt for moving the bolt into and out of said opening in the attaching member, and locking means carried by said lever and movable to one position in which said lever is locked against movement and movable to another position in which said lever is released for movement.

14. Quick release mechanism for parachute harness comprising an attaching member carried by one harness element and having an opening therein, connectors carried by other harness elements and engaging said attaching member, a retaining member overlying said connectors and having a bolt movable into and out of the opening in the attaching member to releasably hold said retaining member and connectors in engagement with said attaching member, a lever pivotally connected to said retaining member and bolt for moving the bolt into and out of said opening in the attaching member, and compressible means carried by said lever and located thereon in position to be engaged by the hand when the lever is grasped for movement, said compressible means being urged toward one position in which said lever is locked against movement and movable to another position when the lever is grasped to release the lever for movement.

15. Quick release mechanism for parachute harness comprising an attaching member carried by one harness element and having an opening therein, connectors carried by other harness elements and engaging said attaching member, a retaining member overlying said connectors and having a bolt movable into and out of the opening in the attaching member to releasably hold said retaining member and connectors in engagement with said attaching member, a lever pivotally connected to said retaining member and bolt for moving the bolt into and out of said opening in the attaching member, said lever having the free end thereof engageable with the retaining member when the bolt is in the opening in the attaching member, and means for releasably holding the free end of said lever in engagement with the retaining member.

16. Quick release mechanism for parachute harness comprising an attaching member carried by one harness element and having an opening therein, connectors carried by other harness elements and engaging said attaching member, a retaining member overlying said connectors and having a bolt movable into and out of the opening in the attaching member to releasably hold said retaining member and connectors in engagement with said attaching member, a lever pivotally connected to said retaining member and bolt for moving the bolt into and out of said opening in the attaching member, said lever having yieldable means on the free end thereof engageable with said retaining member to prevent accidental movement of the lever when the bolt is in the opening in the attaching member, and means on the lever positioned to be moved when the lever is grasped for withdrawing said yieldable means from engagement with the retaining member to release the lever for movement to withdraw the bolt from the opening in the attaching member.

JAMES T. KING.

REFERENCES CITED

The following references are of record in the file of this patent:

UNITED STATES PATENTS

| Number | Name | Date |
| --- | --- | --- |
| 2,003,205 | Kuhlemann | May 28, 1935 |

FOREIGN PATENTS

| Number | Country | Date |
| --- | --- | --- |
| 673,302 | Germany | Mar. 20, 1939 |
| 269,817 | Italy | Dec. 5, 1929 |